UNITED STATES PATENT OFFICE 2,241,201

CONDENSATION PRODUCTS FROM BUTANE TETRACARBOXYLIC ACIDS AND PROCESS FOR PRODUCING SAME

Heinrich Hopff, Ludwigshafen - on - the - Rhine, Germany, assignor, by mesne assignments, to General Aniline & Film Corporation, New York, N. Y., a corporation of Delaware No Drawing. Application June 16, 1939, Serial No. 279,487. In Germany July 12, 1938

9 Claims. (Cl. 260—515)

The present invention relates to condensation products.

I have found that new condensation products are obtained by condensing butane-1,2,3,4-tetracarboxylic acid anhydride or its 2-substitution products, as for example 2-chlorbutane-1,2,3,4-tetracarboxylic acid anhydride or 2-methyl- or 2-phenyl-butane-1,2,3,4-tetracarboxylic acid anhydride, with aromatic hydrocarbons or halogen-substituted aromatic hydrocarbons in the presence of Friedel-Crafts condensing agents. The reaction probably proceeds according to the equation:

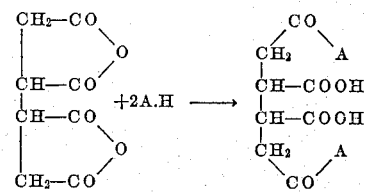

(A being the radicle of an aromatic hydrocarbon or halogenated hydrocarbon).

The butane-1,2,3,4-tetracarboxylic acid anhydrides may be prepared by the oxidation of $\Delta^4$-cyclohexene-1,2-dicarboxylic acids or anhydrides in the liquid phase with nitric acid. $\Delta^4$-Cyclohexene dicarboxylic acids are obtained by adding 1,3-butadiene or its substitution products on to maleic anhydride or substituted maleic anhydrides.

Suitable aromatic hydrocarbons for the reaction are for example benzene, toluene, xylene, naphthalene, alkylnaphthalenes, acenaphthene, diphenyl, terphenyl and their halogen derivatives, in particular bromine and chlorine derivatives such as chlorbenzene, chlornaphthalene or brombenzene.

Among suitable condensing agents of the Friedel-Crafts type there may be mentioned anhydrous aluminium chloride or aluminium bromide, and also anhydrous iron chloride.

The reaction is preferably carried out by heating in the liquid phase a mixture of the initial materials in the approximate ratio of 1 parts of a butane tetracarboxylic acid anhydride with at least 2 parts of an aromatic hydrocarbon or halogen hydrocarbon with an addition of a condensing agent until the splitting off of hydrogen chloride ceases. The reaction temperature usually lies above 60° C., the upper temperature limit depending on the boiling point of the hydrocarbon to be condensed which may be used in excess to serve as a solvent. The reaction mixture is then worked up by adding water. The reaction products thus separate usually in the form of a loose white powder which may be purified in the usual manner, for example by recrystallization. They are soluble in aqueous alkaline solutions.

By heating these primary condensation products to higher temperatures, preferably in the presence of high boiling organic solvents, as for example nitrobenzene, they undergo a further condensation accompanied by a deepening in the color, whereby most probably two more rings are formed and simultaneously a dehydrogenation occurs according to the following scheme:

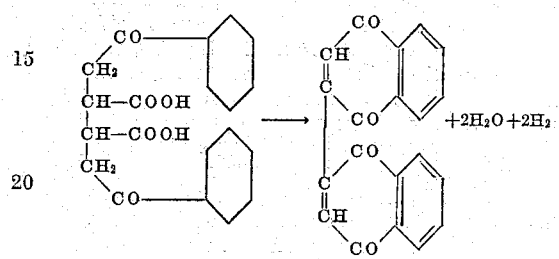

These secondary condensation products have a deep color and dissolve in concentrated sulphuric acid giving deep blue coloration. For example from the condensation product of butane-1,2,3,4-tetracarboxylic acid anhydride and benzene, there is obtained by boiling for some hours in nitrobenzene, a deep brown-violet solution from which brown-red crystals having a melting point of 220° C. separate upon cooling. This further condensation may be accelerated by the addition of agents splitting off water, as for example phosphorus pentoxide or zinc chloride.

The new primary condensation products are suitable for the synthesis of dyestuffs and the secondary ring-closed condensation products may also be directly used for characterizing hydrocarbons (benzine, lubricating oil or the like) because they dissolve therein to give characteristic fluorescence colors.

The following examples will further illustrate how this invention may be carried out in practice but the invention is not restricted to these examples. The parts are by weight.

Example 1

100 parts of butane-1,2,3,4-tetracarboxylic acid anhydride, 400 parts of benzene and 150 parts of anhydrous aluminium chloride are heated to boiling for 7 hours. The resulting viscous melt has ice added to it; the precipitate formed is filtered off by suction, washed with water until neutral and dried. 118 parts of a loose white powder are thus obtained.

By boiling with 10 times the amount of nitrobenzene, it goes into solution with a deep brown-violet coloration and, by cooling, there separate from the solution brown-red leaflets having a melting point of 220° C. After recrystallization, the compound is soluble in concentrated sulphuric acid to give a deep-blue coloration. By pouring the sulphuric acid solution into water, it is reprecipitated in the form of red-brown flocks.

After recrystallization it dissolves in hot paraffin oil giving a brilliant yellow-green fluorescence, and in benzene it forms even in the cold a red-brown solution having an intense brown fluorescence.

By using the same amount of para-xylene or diphenyl instead of the benzene, products having similar properties are obtained.

*Example 2*

100 parts of butane-1,2,3,4-tetracarboxylic acid anhydride, 400 parts of toluene and 150 parts of anhydrous aluminium chloride are slowly heated to boiling while stirring until the splitting off of hydrogen chloride is completed. Ice is added to the reaction product and the precipitate formed is filtered off by suction and extracted with dilute soda solution. By acidifying the soda solution the reaction product is obtained in the form of a brown colored tough resin which when recrystallized from glacial acetic acid yields colorless crystals having a melting point of 209° C.

It dissolves in concentrated sulphuric acid giving a red-brown coloration. By heating the solution, the color changes to emerald green.

By boiling with 5 times the amount of nitrobenzene, a deep violet solution is obtained from which by cooling red-brown crystals having a melting point of above 300° C. separate. They are soluble in benzene giving an orange coloration and a brown fluorescence and dissolve in concentrated sulphuric acid giving a blue-violet coloration.

By using the same amount of diphenyl instead of the toluene, there is obtained by the condensation with the butane tetracarboxylic acid anhydride a beautiful green melt. Naphthalene yields a deep blue melt. The melts obtained by the condensation may be worked up in the same way as hereinbefore described.

What I claim is:

1. A process for the production of condensation products which consists in heating in the liquid phase a butane-1,2,3,4-tetracarboxylic acid anhydride with a member of the group consisting of aromatic hydrocarbons and their halogen substitution products in the presence of Friedel-Crafts condensing agents.

2. A process for the production of condensation products which consists in heating in the liquid phase butane-1,2,3,4-tetracarboxylic acid anhydride with an aromatic hydrocarbon in the presence of aluminium chloride.

3. A process for the production of condensation products which consists in heating in the liquid phase butane-1,2,3,4-tetracarboxylic acid anhydride with an aromatic hydrocarbon in the presence of aluminium chloride, isolating the dicarboxylic acid formed and heating it in a high boiling organic solvent.

4. Condensation products corresponding to the general formula

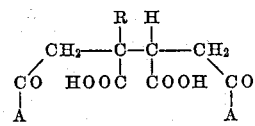

wherein R stands for a member selected from the group consisting of hydrogen, methyl and phenyl and A stands for a radicle selected from the group consisting of aromatic hydrocarbons and halogen substitution products thereof obtained by condensation of one molecular proportion of a butane-1,2,3,4-tetracarboxylic acid anhydride with two molecular proportions of a compound selected from the group consisting of aromatic hydrocarbons and halogen substitution products thereof.

5. Condensation products corresponding to the general formula

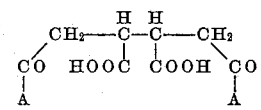

wherein A stands for a mononuclear aromatic hydrocarbon radicle, which condensation products are obtained by condensation of one molecular proportion of butane-1,2,3,4-tetracarboxylic acid anhydride with two molecular proportions of a mononuclear aromatic hydrocarbon.

6. The process as defined in claim 1 in which the reaction mixture is heated to a temperature between 60° C. and the boiling point of the substance of the group consisting of aromatic hydrocarbons and their halogen substitution products.

7. The process as defined in claim 1 wherein the acid anhydrode and the member of the group consisting of aromatic hydrocarbons and their halogen substitution products are present in the molar ratio of 1:2.

8. Condensation products as defined in claim 4 wherein A is a benzene radicle.

9. Condensation products as defined in claim 4 wherein A is a toluene radicle.

HEINRICH HOPFF.